US009110338B2

(12) United States Patent
Chiu (10) Patent No.: US 9,110,338 B2
(45) Date of Patent: Aug. 18, 2015

(54) MASK FOR CURING FRAME SEALANT AND LIQUID CRYSTAL DISPLAY PANEL MANUFACTURING METHOD (75) Inventor: Chung Yi Chiu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 227 days.

(21) Appl. No.: 13/635,846

(22) PCT Filed: Jul. 4, 2012

(86) PCT No.: PCT/CN2012/078149
§ 371 (c)(1),
(2), (4) Date: Sep. 18, 2012

(87) PCT Pub. No.: WO2014/000315
PCT Pub. Date: Jan. 3, 2014

(65) Prior Publication Data
US 2013/0342803 A1 Dec. 26, 2013

(30) Foreign Application Priority Data
Jun. 25, 2012 (CN) .......................... 2012 1 0209808

(51) Int. Cl.
G02F 1/1341 (2006.01)
G02F 1/1339 (2006.01)
(52) U.S. Cl.
CPC ............ *G02F 1/1341* (2013.01); *G02F 1/1339* (2013.01)

(58) Field of Classification Search
CPC .............................. G02F 1/1341; G02F 1/1339
USPC ......................................................... 349/190
See application file for complete search history.

(56) References Cited

FOREIGN PATENT DOCUMENTS

JP 11133442 A * 5/1999 ............ G06F 1/1339

OTHER PUBLICATIONS

Machine Translation for JP 11133442 A.*

* cited by examiner

*Primary Examiner* — Richard Kim
*Assistant Examiner* — Kendrick Hsu
(74) *Attorney, Agent, or Firm* — Kirton McConkie; Evan R. Witt (57) ABSTRACT A mask for curing frame sealant and a liquid crystal display (LCD) panel manufacturing method are provided in the present invention. A transition region is formed in a joining area between a shading region and a transparent region. The shading region is adjacent to the transparent region and the transition region joins the shading region, the transition region includes at least two shading portions and a transparent portion. The shading portion and the transparent portion are alternatively arranged. When the mask is utilized for exposure, the irradiation transmittance in the transition region is lower than the irradiation transmittance in the transparent region and higher than the irradiation transmittance in the shading region.

5 Claims, 6 Drawing Sheets

MASK FOR CURING FRAME SEALANT AND LIQUID CRYSTAL DISPLAY PANEL MANUFACTURING METHOD

FIELD OF THE INVENTION

The present invention relates to a liquid crystal display (LCD) technology, and more particularly to a mask for curing frame sealant and an LCD manufacturing method.

BACKGROUND OF THE INVENTION

In a manufacturing process of a liquid crystal display (LCD) panel, a finished fabrication of a thin film transistor (TFT) substrate is necessary to be bonded with a color filter (CF) substrate.

Figure 1:
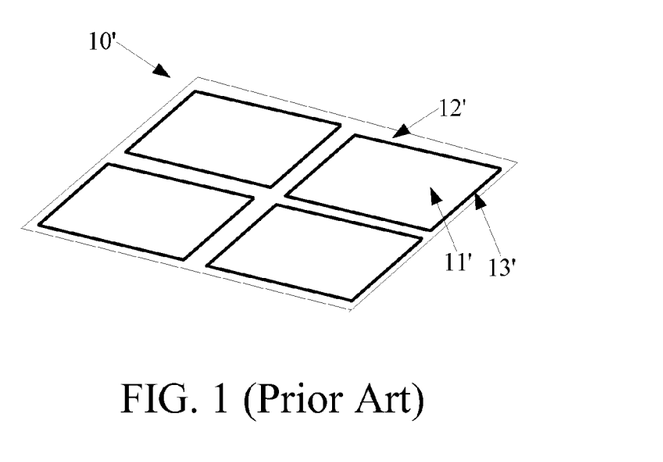
FIG. 1 is a structural schematic view illustrating a TFT substrate in a conventional technology.

Please refer to FIG. 1, which is a structural view illustrating a TFT substrate 10'. The TFT substrate 10' includes display regions 11' and non-display regions 12'. The frame sealant 13' is coated onto each of the circumference areas of the display regions 11' and surrounds each of the display regions 11'.

Figure 2:
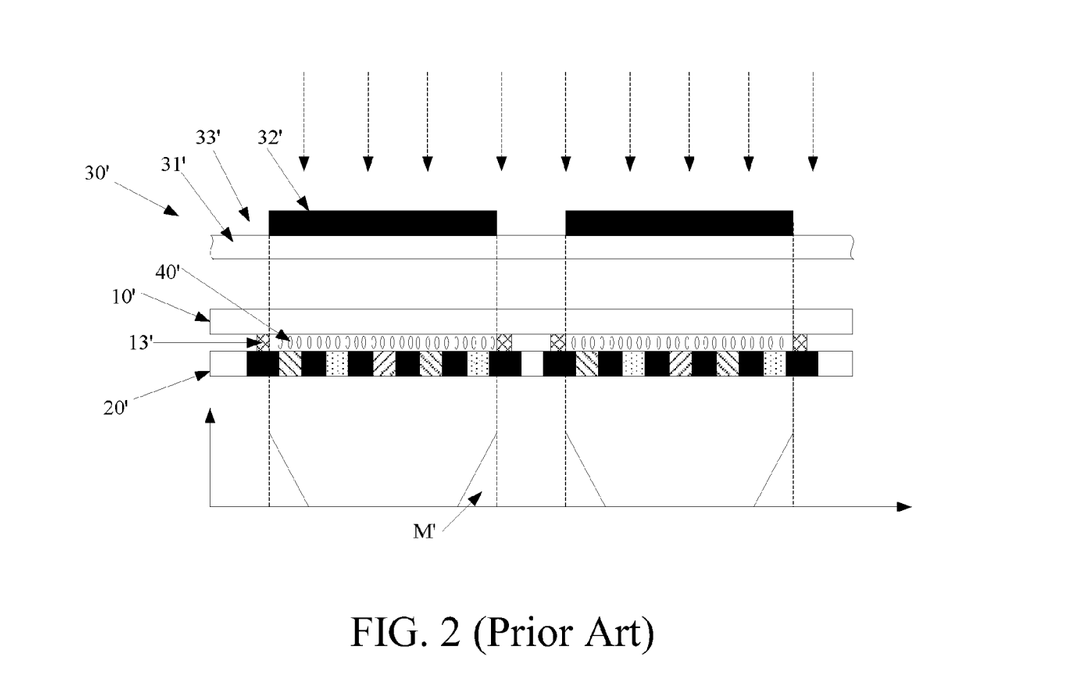
FIG. 2 is a schematic view illustrating a mask used in the irradiation process of the conventional LCD panel manufacture.

Please refer to FIG. 2, which is a schematic view illustrating a conventional LCD panel manufacture utilizing a mask for an irradiation process. After the TFT substrate 10' and the CF substrate 20' are joined, it is necessary to use an ultraviolet (UV) ray to irradiate the frame sealant 13' so that the frame sealant 13' is cured to bond the TFT substrate 10' and the CF substrate 20' together. During the UV ray irradiation, the regions which are not intended to receive radiation are protected by the mask 30'.

In FIG. 2, the mask 30' includes a transparent substrate 31', a plurality of shading regions 32' formed on the transparent substrate 31' by a shading material and the regions which are not shielded by the shading material form a plurality of transparent regions 33'. The transparent regions 33' correspond to the non-display regions 12' of the TFT substrate 10', and the shading regions 32' correspond to the display regions 11' of the TFT substrate 10'. The UV ray can only irradiate the regions corresponding to the non-display regions 12' of the LCD panel, and since the frame sealant 13' is coated onto the non-display regions 12', the frame sealant 13' is cured by the UV ray such that the TFT substrate 10' is bonded with the CF substrate 20', as well as the liquid crystal (LC) molecules of the liquid crystal (LC) layer 40' are sealed therebetween.

However, in practical operation processes, the edge portions of the shading regions 32' are not adequately blocking the UV ray because of actual operation factors and the diffraction property of the UV ray. Therefore, a portion of the UV ray is transmitted to the display regions 11' of the LCD panel. As shown in the figure, the display regions 11' correspond to the LC layer 40', and the LC layer 40' contains LC molecules. M' in FIG. 2 represents the irradiation intensity of the UV ray which is transmitted to the LC layer 40'. In a Polymer Stabilized Vertical Alignment (PSVA) type LCD manufacture process, a pre-polymerization reaction of the monomers occurs when the monomers within the LC layer 40' are irradiated by the UV ray since the LC molecules of the LC layer 40' are blended with the monomers. In a subsequent alignment process of the LC layer 40', the property of the monomers, which are pre-polymerized, are different from the property of other monomers. Different pre-tilt angles are generated within the LC layer 40' when the alignment is performed by applying the same voltage and illumination. Especially, the pre-tilt angles which are generated by the pre-irradiated monomers at the edges of the LC layer 40' are more disordered than the pre-tilt angles which are generated by the other monomers, and the display quality of the PSVA type LCD is affected.

Therefore, the technical problem described above which exists in current technology needs to be resolved.

SUMMARY OF THE INVENTION

An object of the present invention is to provide a mask for curing frame sealant to resolve the technical problem that an irradiation for the frame sealant curing process causes the polymerization reaction of the monomers around the edges of the LC layer, and disordered pre-tilt angles which are generated in post alignment process of the LC layer affect the display result of the LCD.

For achieving the above-mentioned resolution, the present invention proposes a mask utilized for curing frame sealant. The mask comprises a transparent substrate, and the transparent substrate includes a plurality of shading regions formed on the transparent substrate; a plurality of transparent regions adjacent to the shading regions; and a transition region formed in a joining area between the shading region and the transparent region. The transition region which joins the shading region comprises a plurality of shading portions and a plurality of transparent portions, the shading regions and the transparent regions are alternatively arranged.

The shading regions and the transparent regions of the mask for curing frame sealant are sequentially arranged along a length direction, and a width direction is parallel to the mask for curing frame sealant and perpendicular to the length direction, a plurality of shading units are formed in the shading region along the width direction and each of the shading units includes at least one of the shading portions and at least one of transparent portions.

When the mask for curing frame sealant is used in exposure, an irradiation transmittance in the transition region is lower than that in the transparent region but higher than that in the shading region, as a distance between the shading unit and the shading region is increased, the irradiation transmittance in the shading unit is increased.

In one embodiment of the present invention, the shading unit is formed by at least one of the shading portions and at least one of the transparent portions arranged along the width direction, as the distance between the shading unit and the shading region is increased, the area of the shading portion is gradually decreased and the area of the transparent portion is gradually increased.

In one embodiment of the present invention, the shading unit is formed by at least one of the shading portions and at least one of the transparent portions arranged along the length direction, and the shading portion has a width along the length direction and the width of the shading portion is gradually decreased as the distance between the shading unit and the shading region is increased.

In one embodiment of the present invention, the shading unit is formed by at least one of the shading portions and at least one of the transparent portions arranged along the length direction, and the transparent portion has a width along the length direction and the width of the shading portion is gradually decreased when the distance between the shading unit and the shading region is increased.

Another object of the present invention is to provide a mask utilized for curing frame sealant and resolves the technical problem that an irradiation for the frame sealant curing process causes the polymerization reaction of the monomers around the edges of the LC layer, and disordered pre-tilt angles which are generated in a subsequent alignment process of the LC layer affects the display result of the LCD.

For achieving the above-mentioned resolution, the present invention proposes a mask for curing frame sealant which includes a shading region and a transparent region which is adjacent to the shading region.

A transition region is formed in a joining area between the shading region and the transparent region, and the transition region joins the shading region and includes a plurality of two shading portions and a plurality of transparent portions, and the shading portions and the transparent portions are alternatively arranged.

When the mask for curing frame sealant is used in exposure, an irradiation transmittance in the transition region is lower than that in the transparent region but higher than that in the shading region.

In one embodiment of the present invention, the shading region and the transparent region in the mask for curing frame sealant are sequentially arranged in a length direction, and a width direction is horizontal to the mask for curing frame sealant and perpendicular to the length direction, the transition region includes a plurality of shading units along the width direction and the shading units are arranged along the length direction, each of the shading units includes at least one of the shading portions and at least one of the transparent portions, as the distance between the shading unit and the shading region is increased, the irradiation transmittance in the shading unit is gradually increased.

In one embodiment of the present invention, the shading unit is formed by at least one of the shading portions and at least one of the transparent portion arranged along the width direction, and an area of the shading portion in the shading unit is gradually decreased and an area of the transparent portion in the shading unit is gradually increased as the distance between the shading unit and the shading region is increased.

In one embodiment of the present invention, the shading unit is formed by at least one of the shading portions and at least one of the transparent portions arranged along the length direction, and the shading portion has a width along the length direction and the width of the shading portion is gradually decreased as the distance between the shading unit and the shading region is increased.

In one embodiment of the present invention, the shading unit is formed by at least one of the shading portions and at least one of the transparent portions arranged along the length direction, and the transparent portion has a width along the length direction and the width of the transparent portion is gradually increased as the distance between the shading unit and the shading region is increased.

Another object of the present invention is to provide a liquid crystal display (LCD) panel manufacturing method for solving the technical problem that an irradiation for the frame sealant curing process causes the polymerization reaction of the monomers around the edges of the LC layer, and disordered pre-tilt angles which are generated in post alignment process of the LC layer affect the display result of the LCD.

For achieving the above-mentioned resolution, the present invention proposes an LCD panel manufacturing method, and the method includes steps of:

providing a first substrate, a second substrate and a mask; wherein the first substrate is coated by a frame sealant and a transition region is formed in a joining area between a shading region and a transparent region of the mask, the transition region is adjacent to the transparent region and includes at least one shading portion and at least one transparent portion; the shading portion and the transparent portion are alternatively arranged;

joining the first substrate and the second substrate together and placing the mask on the first substrate, so that the transition region corresponds to the frame sealant; and exposing the joined first substrate and the second substrate for curing the frame sealant to bond the first substrate and the second substrate; when using the mask for exposing, an irradiation transmittance in the transition region is lower than that in the transparent region but higher than that in the shading region.

In one embodiment of the present invention, a light is transmitted to the frame sealant and no light is transmitted to a plurality of LC molecules which correspond to the display regions during the step of exposing the joined first substrate and second substrate for curing the frame sealant, and the frame sealant is completely cured by controlling an exposure time.

In one embodiment of the present invention, the shading region and the transparent region in the mask are sequentially arranged along a length direction, and a width direction is horizontal to the mask for curing frame sealant and perpendicular to the length direction.

The transition region includes a plurality of shading units along the width direction and the plurality of shading units are arranged along the length direction; each of the shading units includes the at least one shading portion and the at least one transparent portion; the irradiation transmittance in the shading unit is gradually increased as a distance between the shading unit and the shading region is increased.

In one embodiment of the present invention, the shading unit is formed by the at least one shading portion and the at least one transparent portion arranged along a width direction; as a distance between the shading unit and the shading region is increased, the area of the shading portion in each of the shading units is gradually decreased and the area of the transparent portion is gradually increased.

In one embodiment of the present invention, the shading unit is formed by the at least one shading portion and the at least one transparent portion arranged along a length direction, and the shading portion has a width along the length direction and the width of the shading portion is gradually decreased as a distance between the shading unit and the shading region is increased.

The above-mentioned description of the present invention can be best understood by referring to the following detailed description of the preferred embodiments and the accompanying drawings.

DETAILED DESCRIPTION OF THE PREFERRED EMBODIMENTS

In the following detailed description of the preferred embodiments, reference is made to the accompanying drawings which form a part hereof, and as shown by way of illustration specific embodiments in which the invention may be practiced. In this regard, directional terminology, such as "top," "bottom," "front," "back," "left," "right," "inside," "outside," "side," etc., is used with reference to the orientation of the Figure(s) being described. As such, the directional terminology is used for purposes of illustration and is in no way limiting the present invention.

Figure 3A:
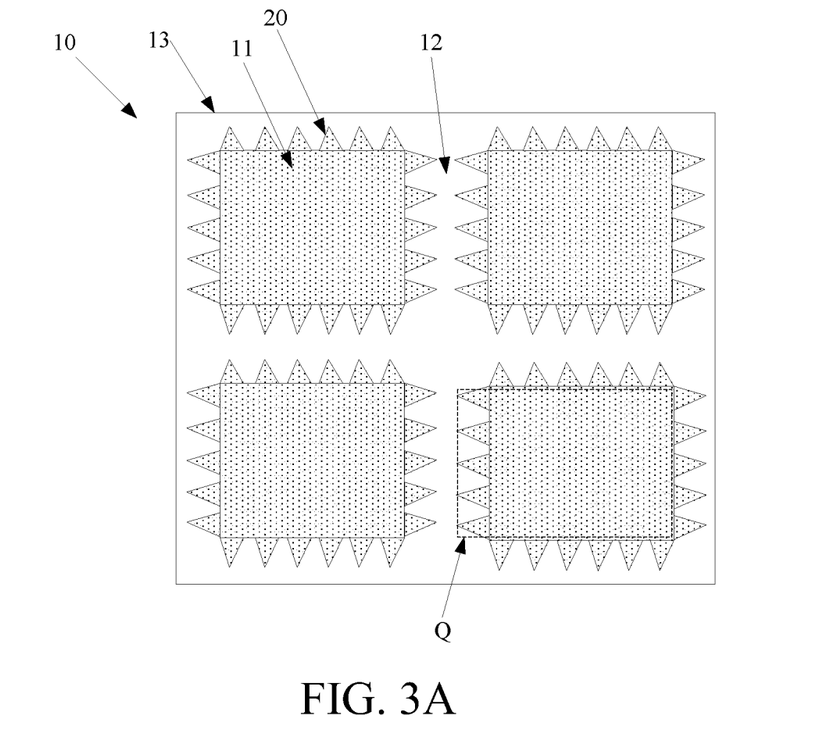
FIGS. 3A and 3B are structural schematic views illustrating a mask for curing frame sealant in a first preferred embodiment of the present invention.

FIG. 3A is a structural schematic view illustrating a mask 10 for curing frame sealant in a first preferred embodiment of the present invention.

The mask 10 includes a transparent substrate 13, a plurality of shading regions 11 formed on the transparent substrate 13 and the shading regions 11 define a plurality of transparent regions 12. The mask 10 in the present invention further includes a plurality of transition regions 20, and the transition region 20 is disposed in a joining area between the shading region 11 and the transparent region 12 which joins the shading regions 11.

Figure 3B:
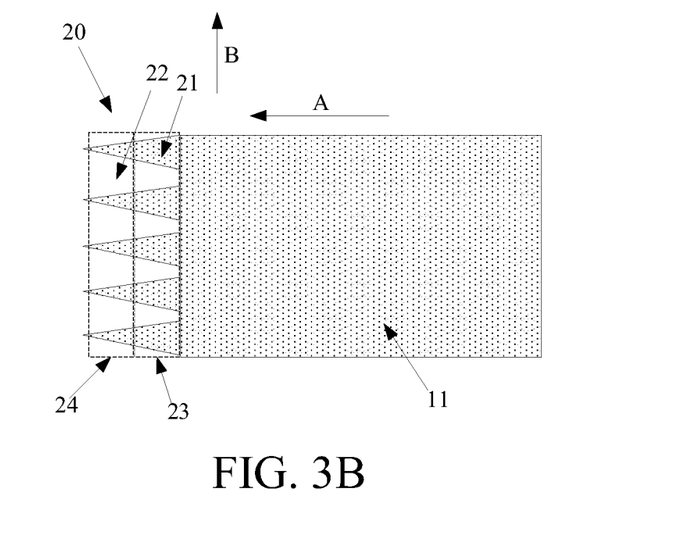

Now refer to FIG. 3B, which is a structural schematic view illustrating the area Q defined by a dotted line area in FIG. 3A. The embodiments shown in FIGS. 4-8 are described in accordance to the area Q in the mask 10.

The transition region 20 includes a plurality of shading portions 21 and a plurality of transparent portions 22. The shading portions 21 and the transparent portions 22 are alternatively arranged. In the embodiment shown in FIG. 3, the shading portions 21 are shown in a triangular shape such that the shape of the shading portion 21 is sharper in the area of the shading portion 21 which is farther away from the shading region 11. Because the shading portions 21 and the transparent portions 22 are alternatively arranged, an irradiation transmittance of an ultraviolet (UV) ray in the transition area is lower than an irradiation transmittance in the transparent region 12 but more than the irradiation transmittance in the shading region 11 when the mask 10 is in an exposure process. For example, the irradiation transmittance of the UV ray in the transition region 20 is a first predetermined rate lower than the irradiation transmittance in the transparent region 12, but a second predetermined rate more than the irradiation transmittance in the shading region 11. The range of the first predetermined rate and the second predetermined rate is about 40% to 60%. For example, if the irradiation transmittance in the shading region is 50%, only half of light is passed through.

Refer to FIG. 3B again, the shading regions 11 and the transparent regions 12 in the mask 10 are sequentially arranged in a length direction A, and a width direction B is horizontal to the mask 10 and perpendicular to the length direction A. For a more clear description, there are at least two shading units defined in the transition region 20 along the width direction B. There are a shading unit 23 and a shading unit 24 described in the embodiment of FIG. 3. The shading unit 23 and the shading unit 24 are arranged along the length direction A, and the shading unit 23 joins the shading region 11. The shading portions 21 and the transparent portions 22 are alternatively arranged in the shading unit 23 along the width direction B. In the present embodiment, as the distance between the shading unit 23 and the shading region 11 is increased, the area of the shading portion 21 in the shading unit 23 becomes smaller and the area of the transparent portion 22 in the shading unit 23 becomes larger so that the irradiation transmittance of the shading unit 23 is gradually increased.

Take for example, the two shading units 23 and 24 shown in FIG. 3, because the shading portion 21 is a triangular shape, the area farther away from the shading region 11 is shaper and the shading area of the shading portion 21 in the shading unit 23 is larger than the shading area of the shading portion 21 in the shading unit 24. Therefore, the irradiation transmittance of the shading unit 23 is smaller than the irradiation transmittance of the shading unit 24, and the light transmitted in the transition region 20 is increased along the direction A until the irradiation transmittance is 100% in the area of the transition region 20 joining the transparent region 12 so that a transitional effect is achieved.

Figure 4:
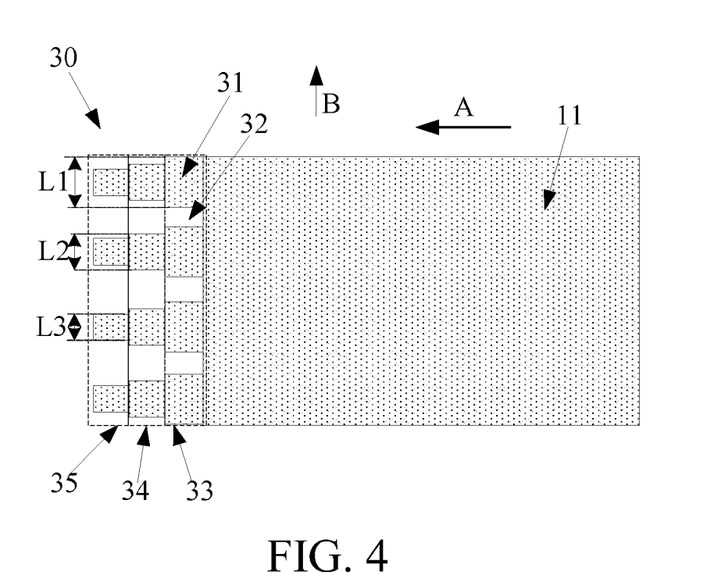
FIG. 4 is a structural schematic view illustrating the mask for curing frame sealant in a second preferred embodiment of the present invention.

Please refer to FIG. 4, which is a structural schematic view illustrating the mask for curing frame sealant in a second preferred embodiment of the present invention.

A transition region 30 is disposed in a joining area between the shading area 11 and the transparent area 12 in the mask 10. The transition region 30 includes a plurality of shading portions 31 and a plurality of transparent portions 32. The shading portion 31 is a square shape and the shading portions 31 are stacked along the direction A. As shown in FIG. 4, according to the distance from the shading region 11, the transition region 30 includes three shading units 33, 34, and 35 in the present embodiment. The shading unit 33 is adjacent to the shading region 11, and the shading unit 35 is disposed in one side of the transition region 30, which is away from the shading region 11.

The square shape of the shading portion 31 becomes smaller from the shading units 33 to 34 to 35. Along the direction A, the lengths of the shading portions 31 in the shading units 33, 34 and 35 are the same. Along the direction B, the width of the shading portion 31 in the shading unit 33 is L1, the width of the shading portion 31 in the shading unit 34 is L2, and the width of the shading portion 31 in the shading unit 35 is L3, wherein L1>L2>L3.

Obviously, in accordance with the description above, the shading area of the shading unit 33 is larger than the shading area of the shading unit 34, and the shading area of the shading unit 34 is larger than the shading area of the shading unit 35. Therefore, the irradiation transmittance is gradually increased in the shading unit 33, 34 and 35. The light transmitted through the transition region 30 is gradually increased along the direction A and the transitional result is achieved.

Figure 5:
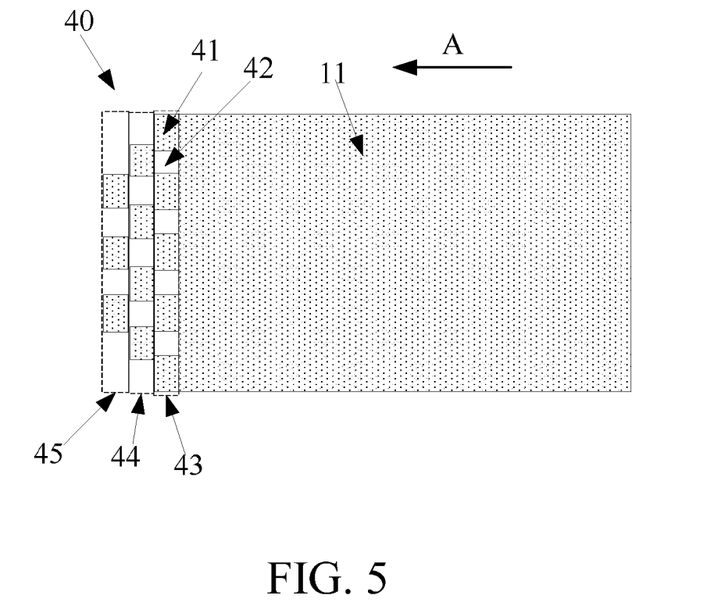
FIG. 5 is a structural schematic view illustrating the mask for curing frame sealant in a third preferred embodiment of the present invention.

Please refer to FIG. 5, which is a structural schematic view illustrating the mask for curing frame sealant in a third preferred embodiment of the present invention.

A transition region 40 is disposed in a joining area between the shading region 11 and the transparent region 12 in the mask 10. The transition region 40 includes a plurality of shading portions 41 and a plurality of transparent portions 42, and the shading portions 41 and the transparent portions 42 are alternatively arranged. As shown in FIG. 5, there are three shading units 43, 44 and 45 and the shading unit 43 joins the shading region 11. The shading unit 45 is disposed in one side of the transition region 40.

The areas of the square shapes in all of the shading portions are the same. The areas of the shading portions 41 are gradually decreased from the shading units 43 to 44 to 45.

Obviously, in accordance with the description above, the shading area of the shading unit 43 is larger than the shading area of the shading unit 44, and the shading area of the shading unit 44 is larger than the shading area of the shading unit 45. Therefore, the irradiation transmittance is gradually increased from the shading unit 43 to 44 to 45. The light transmitted through the transition region 40 is gradually increased along the direction A, thereby achieving transitional effects.

Figure 6:
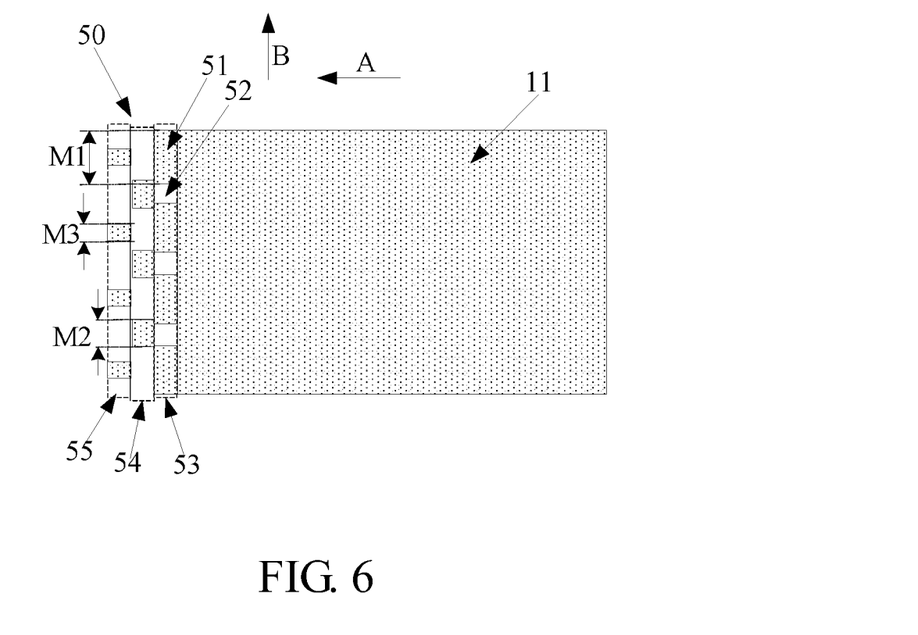
FIG. 6 is a structural schematic view illustrating the mask for curing frame sealant in a fourth preferred embodiment of the present invention.

Please refer to FIG. 6, which is a structural schematic view illustrating the mask for curing frame sealant in a fourth preferred embodiment of the present invention.

A transition region 50 is disposed in a joining area between the shading region 11 and the transparent region 12 in the mask 10. The transition region 50 includes a plurality of shading portions 51 and a plurality of transparent portions 52, and the shading portions 51 and the transparent portions 52 are alternatively arranged. As shown in FIG. 6, there are three shading units 53, 54, 55, and the shading unit 53 joins the shading region 11. The shading unit 55 is disposed in one side of the transition region 50.

Along the direction A, the lengths of the shading portions 51 in the shading units 53, 54 and 55 are the same. Along the direction B, the width of the shading portion 51 in the shading unit 53 is M1, the width of the shading portion 51 in the shading unit 54 is M2 and the width of the shading portion 51 in the shading unit 55 is M3, wherein M1>M2>M3.

Obviously, in accordance with the description above, the shading area of the shading unit 53 is larger than the shading area of the shading unit 54, and the shading area of the shading unit 54 is larger than the shading area of the shading unit 55. Therefore, the irradiation transmittance is gradually increased from the shading unit 53 to 54 to 55. The light transmitted through the transition region 50 is gradually increased along the direction A, thereby achieving transitional effects.

Figure 7:
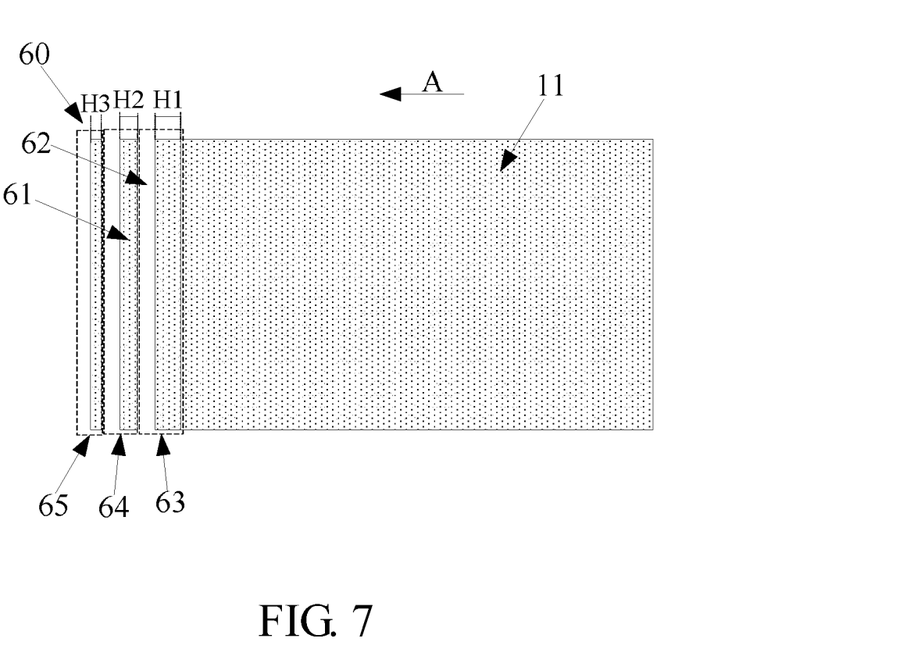
FIG. 7 is a structural schematic view of a backlight module of a second preferred embodiment according to the present invention.

Please refer to FIG. 7, which is a structural schematic view illustrating the mask for curing frame sealant in a fifth preferred embodiment of the present invention.

A transition region 60 is disposed in a joining area between the shading region 11 and the transparent region 12 in the mask 10. The transition region 60 includes a plurality of shading portions 61 and a plurality of transparent portions 62, and the shading portions 61 and the transparent portions 62 are alternatively arranged. As shown in FIG. 7, there are three shading units 63, 64, 65, and the shading unit 63 joins the shading region 11. The shading unit 65 is disposed in one side of the transition region 60.

Each of the shading units 63, 64 and 65 includes an elongated shape shading portion 61 and an elongated shape transparent portion 62. Along the direction A, the areas in the transparent portions 62 are the same because the widths in the transparent portions 62 of the shading units 63, 64, 65 are the same. The width H1 of the shading portion 61 of the shading unit 63 is larger than the width H2 of the shading portion 61 of the shading unit 64, and the width H2 of the shading portion 61 of the shading unit 64 is larger than the width H3 of the shading portion 61 of the shading unit 65.

Obviously, in accordance with the description above, the shading area of the shading unit 63 is larger than the shading area of the shading unit 64, and the shading area of the shading unit 64 is larger than the shading area of the shading unit 65. Therefore, the irradiation transmittance is gradually increased from the shading unit 63 to 64 to 65. The light transmitted through the transition region 60 is gradually increased along the direction A, thereby achieving transitional effects.

Figure 8:
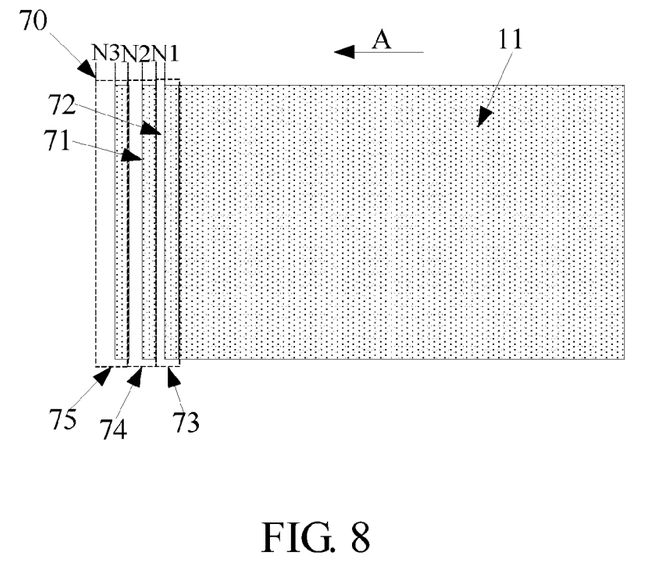
FIG. 8 is a structural schematic view illustrating the mask for curing frame sealant in a sixth preferred embodiment of the present invention.

Please refer to FIG. 8, which is a structural schematic view illustrating the mask for curing frame sealant in a sixth preferred embodiment of the present invention.

A transition region 70 is disposed in a joining area between the shading region 11 and the transparent region 12 of the mask 10. The transition region 70 is formed within the transparent region 12 and includes a shading portion 71 as well as a transparent portion 72. As shown in FIG. 6, there are three shading units 73, 74, 75, and the shading unit 73 joins the shading region 11. The shading unit 75 is disposed in one side of the transition region 70.

Each of the shading units 73, 74 and 75 includes a shading portion 71 and a transparent portion 72. Along the direction A, the widths in the shading portions 71 of the shading units 73, 74 and 75 are the same. The width N1 of the transparent portion 72 of the shading unit 73 is smaller than the width N2 of the transparent portion 72 of the shading unit 74, and the width N2 of the transparent portion 72 of the shading unit 74 is smaller than the width N3 of the transparent portion 72 of the shading unit 75.

Obviously, in accordance with the description above, the shading areas in the shading units 73, 74 and 75 are the same. The transparent area of the shading unit 73 is smaller than the transparent area of the shading unit 74, and the transparent area of the shading unit 74 is smaller than the transparent area of the shading unit 75. Therefore, the percentage of the shading area in the shading unit 73 is larger than the percentage of the shading area in the shading unit 74, and the irradiation transmittance in the shading unit 73 is smaller than the irradiation transmittance in the shading unit 74. The percentage of the shading area in the shading unit 74 is larger than the percentage of the shading area in the shading unit 75, and the irradiation transmittance in the shading unit 74 is smaller than the irradiation transmittance in the shading unit 75. The light transmitted through the transition region 70 is gradually increased along the direction A, and the irradiation transmittance is 100% in the area near the transparent region 12. The transitional effect is achieved.

Figure 9:
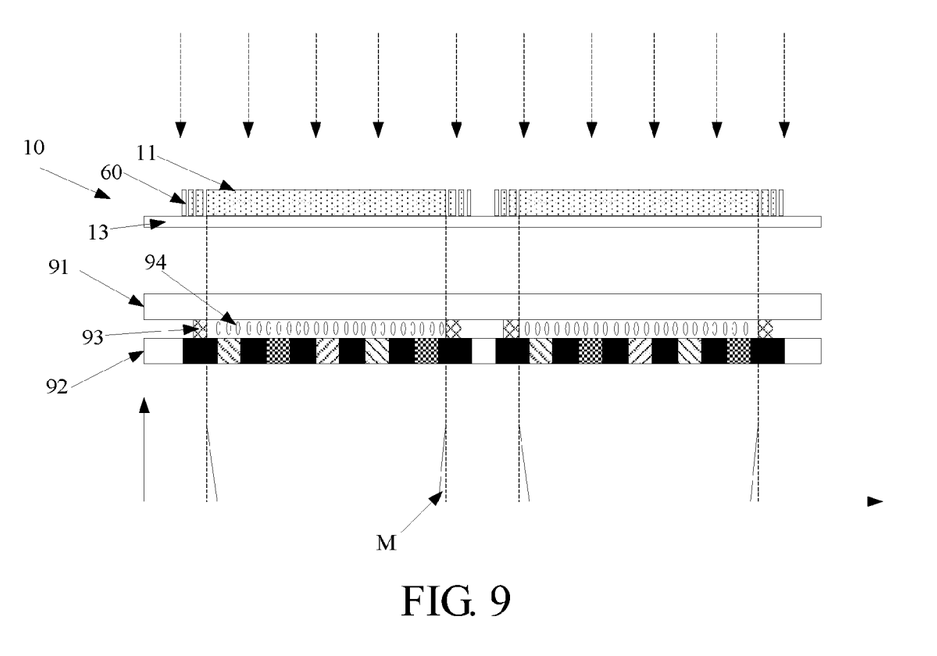
FIG. 9 is a view illustrating the mask for curing frame sealant in the irradiation of the LCD panel manufacture process.

Please refer to FIG. 9, which is a view illustrating the mask for curing frame sealant of FIG. 7 in the irradiation of an LCD panel manufacture process.

The LCD panel includes a first substrate 91 and a second substrate 92. A frame sealant 93 is coated on the first substrate 91. The frame sealant 93 is disposed in a joining area between the display region and the non-display region in the first substrate 91, and surrounds the display region.

Subsequently, the first substrate 91 is bonded to the second substrate 92, and LCs are injected into the display region which is surrounded by the frame sealant 93, thereby forming the LC layer 94. Then the frame sealant 93 proceeded curing process. Practically, the mask 10 in FIG. 7 is provided, and the shading region 11 of the mask 10 corresponds to the display region of the first substrate 91. The transparent region 12 of the mask 10 corresponds to the non-display region of the first substrate 91 and the transition region 60 corresponds to the frame sealant 93.

Thereafter, the first substrate 91 and the second substrate 92 with liquid crystal injected are used in exposure. Because the transition region 60 is disposed in the mask 10, which corresponds to the frame sealant 93, only a portion of light is passed through when the light is transmitted to the transition region 60. The exposure intensity to the display region in the first substrate 91 which is generated by the diffraction of the light is greatly decreased, as the irradiation degree indicated by M shown in FIG. 9. Obviously, compared to prior art, the intensity of the UV ray into the LC layer 94 is much smaller by using the mask in the present invention, and the affected area in the LC layer 94 is smaller. Because the UV ray will not irradiate the monomers, the pre-polymerization reaction of the monomers is avoided.

The light is not only transmitted from the transition region 60 but also diffracted from the transparent region 12 to the frame sealant 93. By controlling adequate exposure time, the frame sealant 93 is completely cured to bond the first substrate 91 to the second substrate 92, thereby protect the monomers in corresponding display regions from the irradiation process so as to avoid the pre-polymerization reaction of the monomers. In a subsequent alignment of the LC layer 94, the pre-tilt angles of the LC layer 94 are kept all the same for maintaining the display effects of the LCD.

Figure 10:
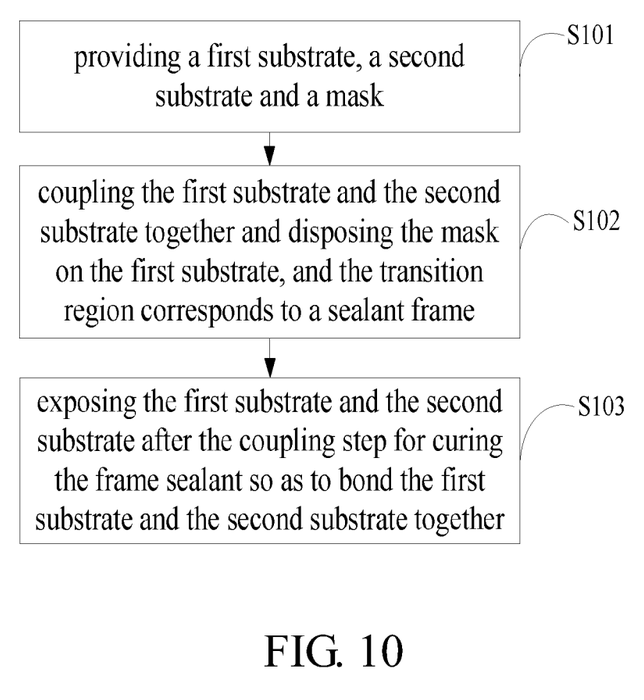
FIG. 10 is a flowchart illustrating the LCD panel manufacture method in the preferred embodiment of the present invention.

FIG. 10 is a flowchart illustrating the LCD panel manufacture method in the preferred embodiment of the present invention.

In step S101, a first substrate 91, a second substrate 92, and a mask 10 are provided.

Wherein, the first substrate 91 is coated with the frame sealant 93. Please also refer to FIG. 7, the mask 10 includes the shading regions 11 and the transparent regions 12, such that the shading regions 11 correspond to the display regions of the LCD panel, and the transparent regions 12 correspond to the non-display regions of the LCD panel. A transition region 60 is disposed in a joining area between the shading region 11 and the transparent region 12, and the transition region 60 corresponds to the frame sealant 93. The transition region 60 includes a plurality of shading regions 61 and a plurality of transparent regions 62. The shading regions 61 and the transparent regions 62 are alternatively arranged.

In step S102, the first substrate 91 bonds with the second substrate 92. The mask 10 is disposed on the first substrate 91, and the transition region 60 corresponds to the frame sealant 93.

In step S103, the first substrate 91 and the second substrate 92 are exposed to UV ray for curing the frame sealant 93, so as to bond the first substrate 91 and the second substrate 92.

During the exposure process, the irradiation transmittance of the RV ray is reduced a predetermined rate because of the transition region 60, and the range of the predetermined rate is 40% to 60%. For example, if the irradiation transmittance of the light in transition region 60 is 50%, then only half of light is passed through the transition region 60.

The light is not only transmitted from the transition region 60 but also diffracted from the transition region 60 to the frame sealant 93. By controlling adequate exposure time, the frame sealant 93 is completely cured for bonding the first substrate 91 to the second substrate 92 to protect the monomers in corresponding display regions from the irradiation, so as to avoid the pre-polymerization reaction of the irradiated monomers. In a post alignment of the LC layer 94, the pre-tilt angles of the LC layer 94 are kept all the same for maintaining the display effects of the LCD.

As described above, the present invention has been described with preferred embodiments thereof and it is understood that many changes and modifications to the described embodiments can be carried out without departing from the scope and the spirit of the invention that is intended to be limited only by the appended claims.

What is claimed is:

1. A liquid crystal display (LCD) panel manufacturing method, the method comprising steps of:
    providing a first substrate, a second substrate and a mask; wherein the first substrate is coated by a frame sealant and a transition region is formed between a shading region and a transparent region of the mask, the transition region is adjacent to the transparent region and includes a plurality of shading portions and a plurality of transparent portions; the shading portion and the transparent portion are alternatively arranged, and at least one of the shading portions is connected with the shading region;
    bonding the first substrate and the second substrate together;
    placing the mask on the first substrate to allow the frame sealant to be covered by the transition region having an irradiation transmittance of 40% to 60%; and
    exposing the joined first substrate and the second substrate for curing the frame sealant to bond the first substrate and the second substrate; when using the mask for exposing, an irradiation transmittance in the transition region is lower than that in the transparent region but higher than that in the shading region.

2. The LCD panel manufacturing method according to claim 1, wherein a light is transmitted to the frame sealant and no light is transmitted to a plurality of LC molecules which correspond to the display regions during the step of exposing the joined first substrate and second substrate for curing the frame sealant, and the frame sealant is completely cured by controlling an exposure time.

3. The LCD panel manufacturing method according to claim 1, wherein the shading region and the transparent region in the mask are sequentially arranged along a length direction, and a width direction is horizontal to the mask for curing frame sealant and perpendicular to the length direction;
    the transition region includes a plurality of shading units along the width direction and the plurality of shading units are arranged along the length direction; each of the shading units includes at least one of the shading portions and at least one of the transparent portions; the irradiation transmittance in the shading unit is gradually increased as a distance between the shading unit and the shading region is increased.

4. The LCD panel manufacturing method according to claim 3, wherein the shading unit is formed by at least one of the shading portions and at least one of the transparent portions arranged along a width direction; as a distance between the shading unit and the shading region is increased, the area of the shading portion in each of the shading units is gradually decreased and the area of the transparent portion is gradually increased.

5. The LCD panel manufacturing method according to claim 3, wherein the shading unit is formed by at least one of the shading portions and at least one of the transparent portions arranged along a length direction, and the shading portion has a width along the length direction and the width of the shading portion is gradually decreased as a distance between the shading unit and the shading region is increased.

* * * * *